United States Patent Office 3,485,547
Patented Dec. 23, 1969

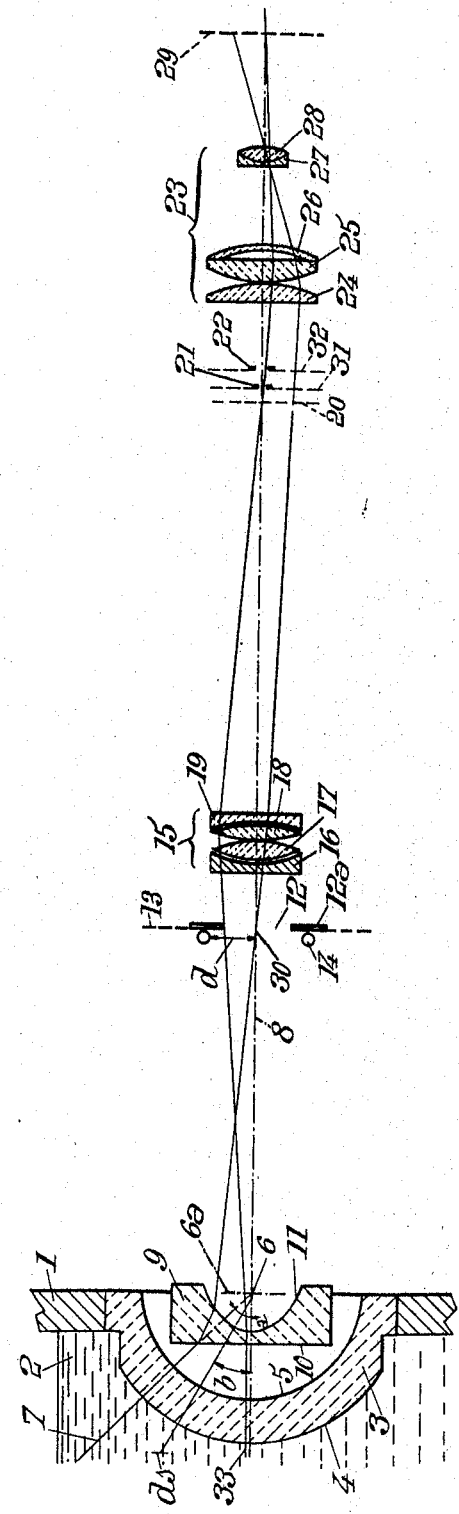

3,485,547
OBSERVATION OR PHOTOGRAPHY DEVICES IN CLOSED SPACES AND IN PARTICULAR IN BUBBLE CHAMBERS
Michel Bougon, Versailles, Edgard Hugues, Courbevoie, and Jean Poivilliers, Neuilly-sur-Seine, France, assignors to Commissariat a l'Energie Atomique, Paris, France
Filed Nov. 14, 1966, Ser. No. 593,808
Int. Cl. G02b *21/06, 17/00, 23/08*
U.S. Cl. 350—17                                    8 Claims

ABSTRACT OF THE DISCLOSURE

A device for viewing the interior of a bubble chamber having flash tubes located between a diaphragm and a wide-angle diverging lens affixed to a window on the bubble chamber. The flash tube light is reflected in the bubble chamber back through the window and the diverging lens which form a virtual image of the bubble chamber's interior. A first converging lens group is located on the opposite side of the diaphragm for the diverging lens and transmits a real image of the virtual image through a mask to a second converging lens which retransmits the real image as a second real image to a camera or the like. The diaphragm stops undesired illumination that is reflected from the window; and the masks stop undesired illumination that is reflected from the divergent lens.

---

The present invention relates to devices for disclosing what takes place in a closed space and it is especially concerned with devices for photographing nuclear phenomenons in a dark closed space which is not accessible, such as a hot cell, a nuclear reactor channel, a Wilson chamber and, in particular, a bubble chamber.

The chief object of this invention is to improve said devices concerning the possible reduction of the observation or photography window provided in the wall of the chamber, the possibility of incorporating powerful illuminating means which do not produce parasitic light and the quality of the image.

Preliminary to setting forth the chief feature of the invention the following definitions will be given:

Being given a dioptrical system, consisting of one or several lenses and a diaphragm provided with a central hole, generally circular, located behind this dioptrical system, with reference to the direction of propagation of light, The "rear pupil plane" is the plane of this diaphragm, and The "front pupil plane" is the image of the rear pupil plane given by said dioptrical system.

Now, the present invention consists, according to the main feature of the present invention, in providing, in combination, the following elements disposed behind one another, starting from the window, and centered on a common optical axis:

A first dioptrical system including a front lens the front face of which is flat, at least substantially, i.e., which may be slightly convex or slightly concave, and the rear face of which is in the form of a surface of the kind consisting of ellipsoidal and paraboloidal surfaces, this first dioptrical system being adapted to give a virtual image of the inside of the chamber and possibly consisting of the window thereof;

A diaphragm and, immediately in front of the rear pupil plane of this diaphragm, a system of illumination toward the front through said first dioptrical system, said illuminating system being preferably disposed substantially symmetrically about said common optical axis;

A second dioptrical system, including several lenses, for transferring toward the rear the virtual image produced by the first dioptrical system and giving a real image of the inside of the space to be observed;

Mask means consisting of a system of masks located in the vicinity of the image plane of the whole of the two above mentioned dioptrical systems for stopping substantially all the light rays from the illuminating system reflected by both of the faces of the lens of the first dioptrical system; and A third dioptrical system, including several lenses, for transferring toward the rear the real image produced by the whole of the two first mentioned dioptrical systems and giving a real image located in a plane where is located a receiver.

Preferably, with such a device, forming both a wide angle objective having a great field depth and a periscope, there is combined, in the wall of the chamber to be observed, a window consisting of an optical glass meniscus the two faces of which are in the form of concentric spherical surfaces, the device being then disposed with respect to this window so that the common center of said spherical surfaces is at the point where the optical axis of the device intersects the front pupil plane, which, on the one hand, eliminates any disturbing reflection on the faces of the window and, on the other hand, reduces the aberrations and eliminates distortions due to the window.

A preferred embodiment of the present invention will be hereinafter described with reference to the appended drawings, given merely by way of example, and in which:

The only figure is a sectional view, through the optical axis, of a device according to the present invention placed opposite the window of a bubble chamber.

This view shows a portion of a bubble chamber 1, containing for instance a mass 2 of liquid hydrogen and provided with a transparent window 3 consisting of a meniscus having an inner spherical face 4 and an outer spherical face 5 both having their center at 6. The left hand portion (not shown) of chamber 1 is coated with a reflecting adhesive strip having the same optical properties as a catadioptrical surface (it reflects the light that strikes it in the incident direction which may be any direction).

The observation and/or photographic device according to the present invention, which constitutes both a wide angle objective (since the angle 2a of the most inclined incident rays 7 is generally greater than 100° and may reach 120–130°) of a focal length averaging 20 mm. and of great field depth and a periscope in view of its length which may reach and even exceed 1 meter, reaching for instance from 1.5 m. to 2.5 m., comprises, starting from window 3, the following elements centered on optical axis 8:

A first dioptrical system including a lens 9 the front face 10 of which is shown flat, but may be slightly convex or concave, and the rear face 11 of which is in the form of an ellipsoid (or possibly of a paraboloid) of revolution, this system giving a virtual image of the inside of chamber 1, A diaphragm 12 and, immediately in front of the rear pupil plane 13 of this diaphragm, an illuminating system 14 directed toward the front through said first dioptrical system 9, said illuminating system 14 being disposed substantially symmetrically about optical axis 8; in particular, illuminating system 14 is located at a distance *d* from axis 8 such that the mask 12a which surrounds (and defines) said diaphragm 12 stops substantially all the light rays from illuminating system 14 that are reflected by faces 4 and 5 of window 3;

A second dioptrical system 15 including several lenses 16, 17, 18, 19 for transferring toward the rear the virtual image given by the first dioptrical system 9 to form in the vicinity of plane 20 a real image of the inside of chamber 1;

A system of masks 21, 22 disposed in the vicinity of the image plane 20 of the whole of the two dioptrical systems 9 and 15 to stop substantially all the light rays from illuminating system 14 reflected by the faces 10 and 11 of lens 9; and A third dioptrical system 23, including several lenses 24, 25, 26, 27, 28, for transferring toward the rear the real image produced by the two first dioptrical systems 9 and 15 to give a real image in a plane 29 where is located an optical receiver (an observer's eye, a photographic plate or film, the mosaic of a television transmitter, etc.).

In a preferred embodiment of the invention, given by way of example, both of the spherical faces 4 and 5 of window 3 have their center at 6 where optical axis 8 intersects the front pupil plane 6a of diaphragm 12 (through lens 9), and lens 9 has a flat front face 10 and an ellipsoidal rear face 11, the focus of the ellipsoid that is at the greater distance therefrom being located at 30, where optical axis 8 intersects the rear pupil plane 13.

When the face 11 of lens 9 is a portion of a paraboloid of revolution, point 6 is the image of the remote focus 30 through lens 9 and, in this case, the distance between point 30 and lens 9 is preferably chosen to range between ten and twenty times the focal length of this lens.

Concerning the aberrations and distortions, it will be noted that when the faces 4 and 5 of window 3 have their common center at a point 6 in the front pupil plane 6a, this window produces no aberration with the exception of a slight spherical aberration and of a field curvature, which can easily be corrected by means of dioptrical systems 15 and 23, calculated to correct also the aberrations introduced by lens 9.

It will also be noted that since the face 11 of lens 9 has a longitudinal section in the shape of an ellipse (or possibly a parabol), an optical beam to be observed extending along a ray, even making a great angle, like ray 7, with optical axis 8, gives, when its cross section tends toward zero, an excellent image, which would not be the case if face 11 had a different longitudinal section. This is the case of a stigmatism for any ray (the sagittal and tangential focal lines being confounded for this radius) and not of a stigmatism within the scope of the convential gauss approximation (for rays little inclined with respect to the axis). Finally, lens 9 has pupil aberrations (which means that it expands the entrance pupil gradually as the distance from the optical axis 8 is greater) so that the illumination of the final image, in plane 29, of an elementary area $ds$ seen under an angle $b$ from optical axis 8 of the order of magnitude of $E_0 \cos b$, if E is the illumination of the final image of an area of the same size and luminance as area $ds$ but which would be seen under an angle $b=0$, instead of the usual law $E=E_0 \cos^4 b$, so that there is obtained a more uniform illumination of the image in plane 29 for an object of uniform luminance.

The illuminating source 14 consists advantageously of a tore-shaped flash tube, but it may comprise several electric bulls disposed in an annular row surrounding optical axis 8.

Masks 21 and 22 (which have the shape of circular annular elements, as shown, in the case of a tore-shaped flash tube) may be advantageously made as follows. Two photographic films or plates are placed in the planes 31 and 32 where said masks are to be located and the illuminating system 14 is brought into operation, the whole of the device being in position. The light rays from said illuminating system 14 not only illuminate the inside of chamber 1, passing successively through faces 11, 10, 5 and 4, but also undergo parasitic reflections on these faces. The rays that have passed through lens 9 from the rear toward the front form an image of the flash tube in the front pupil plane 6a in the vicinity of point 6 and the rays transmitted from this image extend substantially normally to the faces 5 and 4, of center 6. Therefore the reflected parasitic rays travel back along their paths toward lens 9, thus forming an image in the rear pupil plane 13. The rays from flash tube 14 reflected by faces 4 and 5 are finally stopped by mask 12a, which limits diaphragm 12. As for the rays from flash tube 14 reflected by faces 11 and 10, they pass through diaphragm 12 and dioptrical system 15 and transfer into planes 31 and 32 the images of flash tube 14 in "mirrors" 11 and 10. These images sensitize the photographic films or plates placed in said planes and cause the silver salt or other sensitive substance of said films or plates to be blackened or otherwise acted upon. It is then possible to use as masks either these blackened films or plates or screens obtained by transferring in any suitable manner these blackened pictures onto other supports or, again, screens having dimensions equal to, or slightly greater than, those measured on the blackened films or plates. In view of the fact that, as a rule, reflections on window 3 have no effect on the determination of the dimensions of masks 21 and 22, these masks can be determined without the device being disposed in front of the window of a bubble chamber.

The drawing shows the paths of travel of two extreme rays, to wit a ray 7 of maximum inclinations $a$ and an axial ray 33 passing close to the limit of diaphragm 12.

The device according to this invention has, over existing devices used for the same purpose, many advantages among which the following ones may be cited.

First, it constitutes a wide angle objective without distortion and having a great field depth.

It has an entrance pupil at the front which permits of reducing the size of the chamber window, which is very interesting in the case of bubble chambers.

The front lens 9 of the device may even constitute, if this is useful, the window.

The exit pupil is remote from the image plane of the front lens 9 which permits easy image transfers. The device therefore constitutes a periscope the length of which may reach or exceed 1 m. and reach, for instance, 2.50 m.

The device includes an illuminating system, in particular an annular flash tube, located after the front lens.

The parasitic lights are excluded and the effect of illumination is correct, even for incident rays very much inclined with respect to the optical axis.

Since the objective is a wide angle objective with a great depth of field, it is possible to obtain, with a window of moderate size, a good image of the whole inside space of a large size chamber, in particular of the whole of the bubbles formed along the paths of the trajectories of charged particles in a large size bubble chamber, the illuminating system 14 being brought into play in synchronism with the starting of the operation of the bubble chamber.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What we claim is:

1. A device for viewing the interior of a chamber through a window therein comprising in alignment along an optical axis of said device;

a diverging lens adjacent said chamber and including element having a substantially plano first surface and an aspheric second surface for producing a virtual image of said chamber interior;

a first converging lens group spaced from said virtual image of said chamber interior by the distance of one of its conjugates for forming a first real image of said chamber interior;

a diaphragm located between said diverging lens and said first converging lens group;

illumination means between said diaphragm and said diverging lens for directing light through said diverging lens into said chamber;

a second converging lens group spaced from said first converging lens group by the sum of one of its conjugates and the other conjugate of said first lens group for forming a second real image of said chamber interior at a receiver; and a mask means between said first and second converging lens groups for stopping light rays reflected from said diverging lens.

2. The apparatus of claim 1 including means in said chamber for reflecting light from said illumination means towards said diverging lens.

3. The apparatus of claim 1 wherein an image of said diaphragm is formed at a front pupil plane; and wherein said diverging lens includes said window, said window being comprised of first and second concentric spherical surfaces having their common center at the intersection of said optical axis with said front pupil plane.

4. The apparatus of claim 3 including means in said chamber for reflecting light from said illumination means toward said diverging lens.

5. The apparatus of claim 1 wherein said illumination means is disposed symmetrically about said common optical axis.

6. The apparatus of claim 5 wherein said illumination means includes a tore-shaped element, the mean radius of which is such that said mask means surrounding said diaphragm stops substantially all of the light rays from said illuminating system and reflected by said window faces.

7. The apparatus of claim 1 wherein said aspheric second surface is spherical.

8. The apparatus of claim 1 wherein the mask means are of photo-sensitive elements placed in the planes of said masks and sensitized by operation of said illuminating system.

References Cited

UNITED STATES PATENTS

| 1,884,994 | 10/1932 | Kitroser | 350—17 |
| 2,262,534 | 11/1941 | Hoch | 350—179 |
| 2,730,014 | 1/1956 | Ivanoff et al. | 350—179 |
| 2,738,708 | 3/1956 | Rosin | 350—181 X |
| 2,868,992 | 1/1959 | Monk | 350—179 X |
| 3,037,426 | 6/1962 | Hugues | 350—192 |
| 3,226,539 | 12/1965 | Rosin et al. | 350—181 |
| 3,326,621 | 6/1967 | Nygorden | 350—179 |

FOREIGN PATENTS

| 1,040,064 | 5/1953 | France. |

DAVID SCHONBERG, Primary Examiner

P. R. GILLIAM, Assistant Examiner

U.S. Cl. X.R.

350—27, 52, 54, 179, 189, 205